United States Patent [19]
Reilly

[11] 3,932,084
[45] Jan. 13, 1976

[54] BLOW NEEDLE ASSEMBLY

[75] Inventor: Joseph R. Reilly, Naugatuck, Conn.

[73] Assignee: Monsanto Company, St. Louis, Mo.

[22] Filed: Dec. 16, 1974

[21] Appl. No.: 533,238

[52] U.S. Cl. ........ 425/182; 425/186; 425/DIG. 204
[51] Int. Cl.² ......................................... B29D 23/02
[58] Field of Search .......... 425/DIG. 204, 182, 185, 425/186, 192; 264/98

[56] References Cited
UNITED STATES PATENTS

| | | | |
|---|---|---|---|
| 3,198,861 | 8/1965 | Marvez | 425/326 B |
| 3,310,834 | 3/1967 | Simpson et al. | 425/182 |
| 3,513,502 | 5/1970 | Chambers | 425/326 B |
| 3,538,211 | 11/1970 | Adomaitis | 425/387 B |
| 3,752,621 | 8/1973 | Shelby | 425/192 |
| 3,767,350 | 3/1972 | Horberg et al. | 425/387 B |

*Primary Examiner*—Francis S. Husar
*Assistant Examiner*—Carl Rowold
*Attorney, Agent, or Firm*—Michael J. Murphy

[57] ABSTRACT

In inflating a parison via a hollow needle carried on a piston slidably reciprocable with respect to a blow mold cavity, the improvement comprising means accessible through the forward end of the needle for releasably securing the needle to the piston.

13 Claims, 4 Drawing Figures

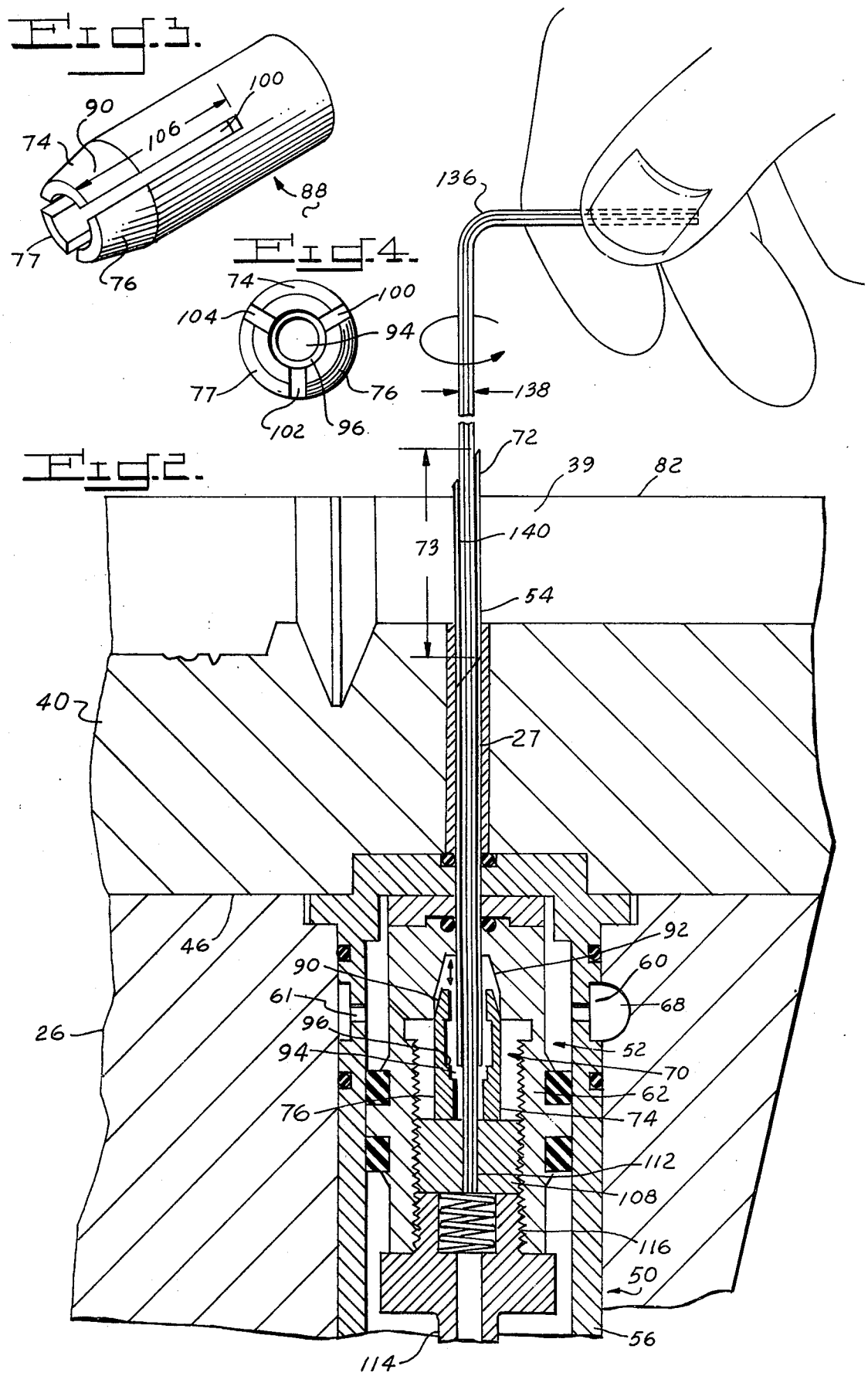

3,932,084

BLOW NEEDLE ASSEMBLY

CROSS REFERENCE TO RELATED APPLICATION

U.S. Ser. No. 447,442, filed Mar. 4, 1974.

BACKGROUND OF THE INVENTION

This invention relates to blow molding and more particularly to an improved blow needle assembly for expanding a pliable thermoplastic parison within a blow mold.

As described in U.S. Pat. Nos. 3,513,502; 3,752,621; and 3,767,350, it is desirable to equip needle assemblies for expanding distendable tubular parison portions within a blow mold with means facilitating rapid replacement of the needle in order to avoid holding down the molding machine, which generally includes a plurality of mold stations, for any extended period of time. Heretofore, hhowever, as far as is known, the entire assembly including the fluid motor mounting the blow needle had to be removed from the mold section in which it was operable in order to replace the needle, even though the latter frequently was the only part needing attention. With such arrangements, the needle would be removed from the actuating assembly and replaced with another while the machine was held out of operation or else an entire spare assembly had to be kept available to minimize machine downtime.

SUMMARY OF THE INVENTION

Now, however, an improved needle assembly has been developed which permits changing only the blow needle through the cavity section of the blow mold where the parison is blown without disturbing the remainder of the assembly actuating system.

Accordingly, it is a principal object of this invention to provide an improved needle assembly for use with a blow mold which facilitates replacement of a needle in a remarkably short time.

An additional object of this invention is to provide such an improved assembly which is especially suited for use with each of a plurality of mold stations in a wheel type blow molding machine wherein the mold sections open and close in a direction radial to a horizontal axis.

Other objects of this invention will in part be obvious and will in part appear hereinafter from the following description and claims.

These and other objects are accomplished in a needle assembly including piston means carrying a hollow needle slidably reciprocable with respect to a cavity portion of a blow mold, by providing the improvement which comprises, in combination, means accessible through the needle for releasably securing the needle to the piston means.

The preferred means for releasably securing the needle comprises jaw members coactive with wall portions of a bore in the piston means for tightly embracing a rear portion of the needle on application of a linear force thereto and for expanding away therefrom on release of such force.

BRIEF DESCRIPTION OF THE DRAWINGS

In describing the overall invention reference will be made to the accompanying drawings wherein:

FIG. 2 is a partial, sectional view similar to FIG. 1 showing the needle released from operative position in the assembly;

FIG. 3 is a perspective view and FIG. 4 a front view of one component of the assembly of FIGS. 1 and 2.

DETAILED DESCRIPTION OF ILLUSTRATED EMBODIMENT

Figure 1:
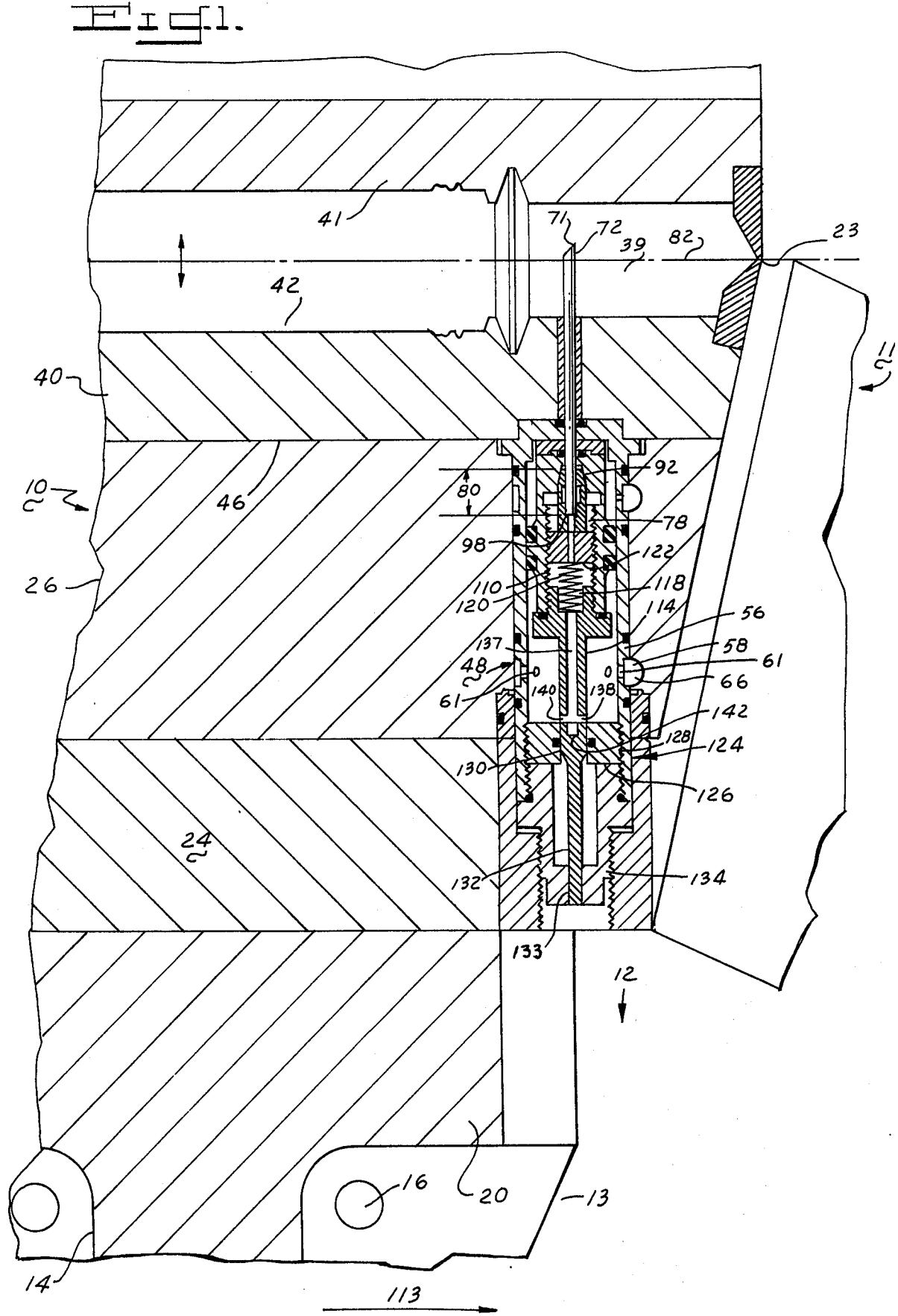
FIG. 1 is a vertical sectional view of apparatus embodying the invention.

Referring now to the drawings, there is shown in FIG. 1 a preferred molding environment in which the improved needle assembly of the invention is especially well suited for use, and includes one station 10 of a circularly-arranged multi-station rotary blow molding machine for forming hollow articles from portions of an extruded tubular thermoplastic parison in general, rather conventional manner. An identical station 11 is immediately adjacent station 10 such that accessability to the components, to be described in the vicinity and direction of arrow 12 is difficult in view of the rather crowded condition of the system in such area. In brief, the blow molding machine of which station 10 is a part comprises a driven, horizontal central shaft carrying a hub to which a large diameter circular plate is secured. A series of spoke-like arms one for each mold station, extend radially of the wheel axis and are fastened to this circular plate. A mold spacer casting 13 which includes rib 14 and outer platform 20 is provided for each mold station 10 and is secured by suitable bolts through holes 16 to its radial arm, not shown. This structure is generally relatively conventional as is shown in U.S. Pat. No. 2,784,452.

Each station 10 includes a split blow mold comprising inner mold section 40 having a molding cavity 42 formed therein opening toward outer mold section 41 which is substantially complementary to section 40. Portion 39 of cavity 42 may be provided for containing a waste moil section, not shown, integrally formed with the article during molding and which is removed thereafter as part of the finishing operation. Face 46 of section 40 parallel to and opposite from the side in which cavity portion 42 is formed is conventionally secured to support block 26, the latter in turn being supported on backup plate 24 which is secured to platform portion 20 of casting 13.

A blow needle assembly 48 is provided for each mold station and includes cylinder means, generally indicated as 50, and piston means, generally indicated as 52 (FIG. 2), slidably reciprocable within cylinder means 50 and carrying hollow needle 54 on its forward end whereby the latter is moved into and out of portion 39 of molding cavity 42. Assembly 48 is in a bore in support block 26 which continues on one end into backup plate 24 and at the other end is in communication with extension 27 in inner mold section 40.

Cylinder means 50 includes hollow cylinder housing 56 seated in the bore in support block 26 having a pair 58, 60 of circumferentially extending annular slots communicating with sets of circumferentially disposed flow orifices 61 in the wall of housing 56, one set being present on either side of piston 62. Slots 58 and 60 are aligned and in communication with trunk flow passages 66, 68 in block 26, which in turn are conventionally operatively associated with a source of fluid pressure, e.g. air, including automatically operated valves, not shown, for intermittently introducing such pressurized fluid to and venting it from the assembly.

In accordance with the invention, means, collectively designated 70, are provided for releasably securing needle 54 to piston 62 of piston means 52 and which are conveniently accessible through the forward, cavity-entering end 72 of needle 54. Means 70 comprises jaws 74, 76 and 77 (FIGS. 2-4) adapted to coact with wall portions of central bore 78 in piston 62 to tightly embrace rear section 80 of needle 54 on application of a linear force in a direction toward mold parting line 82, and, conversely, to expand away from rear portion 80 on release of such force in order to allow needle 54 only to be extracted from the assembly through bore extension 27 in a direction perpendicular to and toward mold parting line 82. In the embodiment shown, jaws 74, 76 and 77 are an integral part of collet 88 (FIGS. 3 and 4) which is wedge-shaped on its forward end at 90 for slidable cooperation with complementary surface 92 of reduced diameter forward portion of bore 78. Axially extending through passage 94 in collet 88 is stepped or shouldered at 96 to act as a seat for end face 98 of needle 54 (FIG. 1) when the latter is in secured, operational position. The circumferential wall defining passage 94 in collet 88 is longitudinally slotted at 100, 102 and 104 for a portion 106 of its length to permit jaws 74, 76 and 77 to concentrically close on end portion 80 of needle 54 as wedgeshaped end 90 is slidably urged along surface 92. Though not shown, the wall of needle 54 may be recessed or undercut inwardly toward its axis in portion 80 such that the needle-contacting surfaces of the jaws seat therein when surface 98 is against step 96 and the jaws are closed on the needle, thereby increasing the bite of such jaws thereon and more firmly grasping the needle. The linear force in a direction toward cavity 42 for closing the jaws is exerted via locknut 108 rearward of collet 88 and threaded on its outer surface for cooperation with a threaded section 110 of bore 78. Multi-sided, e.g. hexagonal, central socket or opening 112 is coaxial with needle 54 in locknut 108.

Stem portion 114 of piston means 52 projects rearward of piston 62 and is threadably secured at 116 to the latter. Biasing means such as compression spring 120 may be seated in circular recess 118 in stem portion 114 and cushionably biased forward against a circular portion of rear face 122 of locknut 108 to resist any tendency of the latter to back off prematurely during operation of the system due to vibration and the like. An elongated tool such as wrench 136 having a maximum cross section 138 which is less than that of the hollow interior 140 of needle 54 and a length somewhat greater than that of the latter is part of the means 70 for releasably securing needle 54 to piston means 52.

End cap means 124 of cylinder means 50 includes guide ring 126 threadably secured at 128 in the rear end of cylinder housing 56 having a through bore 130 therein slidably receiving stem portion 114. Anti-rotation means associated with piston means 52 may be provided and in the illustrated embodiment comprises a non-round, e.g. square, end section 132 of stem portion 114 slidable within a complementary configured cavity 133 of stationary end cap 134 when piston 62 moves between its forward and rearward positions, section 132 always being within cavity 133 in a nonrotating position regardless of the position of piston 62.

Flow passage 137 in stem portion 114 having a pair of laterally disposed ports 138, 140 opening to the interior of housing 56 is in turn in open communication with the hollow interior 140 of needle 54.

Seals such as resilient O-rings shown unnumbered in the drawings may be conventionally inserted as required between the various parts of the assembly to prevent unwanted leakage of the pressurized air between opposing faces of such parts.

When it is desired to remove needle 54 from operative position on the front end of piston 62, mold sections 40 and 41 are held in open position separated from each other by the mold opening and closing structure, not shown, and the assembly arranged by manipulating valving on the pressurized air such that needle 54 is in the forward position of FIG. 2. Wrench 136, as illustrated in FIG. 2, is manually inserted through hollow interior 140 of needle 54 into socket 112 in locknut 108 (FIG. 2) and then rotated to thread locknut 108 rearwardly in bore 78 to a needle-release position, while at the same time further compressing spring 120. Needle 54 is then manually pushed rearwardly in a direction away from parting line 82 which force, via face 98 acting against shoulder 96, causes the jaws of collet 88 to spring open away from end portion 80 of needle 54 such that it may be manually extracted through passage 27 in mold section 40. To replace such needle, locknut 108 via wrench 136 is threaded forwardly a short distance to partially close the jaws of collet 88, another needle is inserted in the reverse direction such that its rear face 98 seats against shoulder 96, whereupon locknut 108 is further rotated forwardly to bring end 90 of collet 88 into wedged engagement with surface 92 and cause jaws 74, 76, 77 to tightly embrace end portion 80 of needle 54. This completes the replacement task which can be limited to a remarkably short time without requiring removal of any of the associated parts of the overall blow needle assembly from their functional position within the mold assembly.

In operation, a portion of an extruded generally tubular parison (not shown) is disposed between inner and outer mold sections 40 and 41 while separated from each other about parting line 82. Section 41 is then closed on section 40 to clamp the parison portion on either end via pinch surfaces on the mold sections such as shown at 23. As station 10 moves in the direction of arrow 113 (FIG. 1) around the molding machine, the clamped off parison portion is expanded outwardly against the surfaces of the mold cavity to form the molded article.

With respect to the blow needle assembly 48 by means of which this is accomplished, during positioning of the parison portion between the mold sections, needle 54 is in its retracted position such that tip 71 is at the lower end of distance 73 in FIG. 2, which distance represents the extent of needle travel. Thereupon pressurized air is admitted through passage 66 in support block 26 and orifices 60 and exerted against the rear of piston 62 so as to cause it to reciprocate forward in cylinder housing 56. Prior to reaching its full forward position, such air cannot enter needle 54 since cross ports 138, 140 are rearward of guide ring 126. Such advancing movement of piston 62 will cause sharp leading end 71 of needle 54 to penetrate the wall of the clamped parison and assume the position of FIG. 1. At this point, cross ports 138, 140 are forward of guide ring 126 and thereby establish communication between passage 137 and the pressurized interior of cylinder housing 56 so that the pressurized air can flow into the hollow interior of needle 54 through passage 137 and exit into the cavity of the blow mold to expand the parison portion outwardly to form the article.

After the plastic of the formed article has been set by the cooling medium flowing through conventional channels in the mold sections, not shown, valving associated with passage 66 in support block 26 is actuated, preferably automatically, to terminate the flow of air into the mold and vent passage 66 to atmosphere. Imposition of air pressure through passageway 68 will then cause piston 62 to slide to the rear bringing the tip of needle 54 to the lower end of distance 73 to permit ejection of the formed article from the mold.

The above description and particularly the drawings are set forth for purposes of illustration only and are not to be taken in a limited sense. Various modifications and alterations will be readily suggested to persons skilled in the art. For example, though the improved needle assembly has been described in conjunction with a particular form of wheel-type blow molding machine, it should be realized that it can be used equally well with any of a wide variety of other single or multi-station blow molding machines wherein a needle-like member is utilized to puncture and act as a conduit for a pressurized medium for expanding a thermoplastic parison portion within a blow mold. Similarly, though a particular mechanical arrangement has been disclosed for releasably holding the needle in place while permitting removal and replacement of it alone through the face of the mold along the parting line thereof, alternative arrangements for carrying out such concept may be employed. It is intended, therefore, that the foregoing be considered as exemplary only and that the scope of the invention be ascertained from the following claims.

What is claimed is:

1. In a needle assembly including piston means carrying a hollow needle slidably reciprocable with respect to a cavity portion of a blow mold, the improvement which comprises, in combination, means accessible through said needle for releasably securing said needle to said piston means.

2. The assembly of claim 1 wherein said means for releasably securing is accessible through the forward, cavity-entering end of the needle.

3. The assembly of claim 2 wherein said means for releasably securing comprises jaw members coactive with wall portions of a bore in the piston means to tightly embrace a rear portion of the needle on application of a linear force and to expand away therefrom on release of said force.

4. The assembly of claim 2 wherein said means for releasably securing includes an elongated wrench member having a maximum cross section less than that of the hollow interior of the needle and a length greater than said needle.

5. The assembly of claim 3 wherein said means for releasably securing includes:
   a. a locknut rearward of said jaw members linearly movable in said bore having a central socket portion; and
   b. a tool insertable in said socket portion through the hollow interior needle for turning said locknut.

6. The assembly of claim 5 including biasing means in said piston means urging said locknut forward in said bore.

7. The assembly of claim 5 including anti-rotation means associated with said piston means.

8. In a needle assembly containing cylinder means and piston means carrying a hollow needle slidably reciprocable in said cylinder means, the improvement which comprises, in combination, means accessible through said needle for releasably securing said needle to said piston means including:
   A. a collet having a wedge-shaped end cooperable with walls of a central bore in a piston portion of the piston means and an axially extending through-passage containing a shoulder for the end face of said needle, said bore having a threaded section along its length;
   B. a locknut in said central bore rearward of said collet cooperable with the threaded section thereof and having a central opening therein;
   C. a wrench insertable in said opening through the hollow interior of said needle to advance said locknut in one direction against the collet to tightly close on a rear portion of said needle and to back said locknut off in the opposite direction to permit release of said needle.

9. The assembly of claim 8 including a compression spring in said bore rearward of said bearing against said locknut.

10. The assembly of claim 8 including means preventing relative rotation of the piston during movement of the locknut.

11. The assembly of claim 8 wherein said cylinder means includes longitudinally spaced sets of circumferentially disposed flow orifices formed in a wall of said cylinder means on either side of said piston in communication with trunk flow passageways in a support block carrying said cylinder means.

12. The assembly of claim 8 wherein:
   A. said piston means includes a stem portion projecting rearwardly of said piston; and
   B. said cylinder means includes end cap means for delimiting rearward movement of said piston means including a guide ring having a through-bore slidably receiving said stem portion;
   C. said stem portion having a non-round, rotation-preventing end section located within a complementary portion of said end cap means.

13. In a split mold having an internal cavity, a needle assembly including a hollow blow needle, means for reciprocating said needle in a bore formed in a section of said split mold to puncture and expand in said cavity a clamped off portion of a tubular parison, the improvement which comprises means accessible through said needle for releasably securing said needle to said means for reciprocating it.

* * * * *